United States Patent
Wu et al.

(10) Patent No.: US 10,659,237 B2
(45) Date of Patent: May 19, 2020

(54) SYSTEM AND METHOD FOR VERIFYING INTEGRITY OF AN ELECTRONIC DEVICE

(71) Applicant: Huawei International Pte. Ltd., Singapore (SG)

(72) Inventors: Yongzheng Wu, Singapore (SG); Xuejun Wen, Singapore (SG); Chengfang Fang, Singapore (SG); Tieyan Li, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 149 days.

(21) Appl. No.: 15/718,712

(22) Filed: Sep. 28, 2017

(65) Prior Publication Data

US 2018/0019880 A1 Jan. 18, 2018

Related U.S. Application Data

(63) Continuation of application No. PCT/SG2017/050102, filed on Mar. 3, 2017.

(30) Foreign Application Priority Data

Mar. 29, 2016 (SG) .............. 10201602449P

(51) Int. Cl.
*H04L 9/32* (2006.01)
*G06F 21/70* (2013.01)
(Continued)

(52) U.S. Cl.
CPC .......... *H04L 9/3271* (2013.01); *G06F 21/575* (2013.01); *G06F 21/70* (2013.01); *G06F 21/83* (2013.01)

(58) Field of Classification Search
CPC ..... H04L 9/3271; G06F 21/575; G06F 21/70; G06F 21/83
See application file for complete search history.

(56) References Cited

U.S. PATENT DOCUMENTS

| 7,236,455 B1 | 6/2007 | Proudler et al. |
| 7,640,583 B1 | 12/2009 | Marinescu et al. |

(Continued)

FOREIGN PATENT DOCUMENTS

| CA | 2835063 A1 | 11/2012 |
| CN | 101103584 A | 1/2008 |

(Continued)

OTHER PUBLICATIONS

"Digital signature", Wikipedia, the free encyclopedia, https://en.wikipedia.org/wiki/Digital_signature. (Retrieved from Internet on Nov. 14, 2017).

(Continued)

*Primary Examiner* — Ali S Abyaneh
*Assistant Examiner* — Shu Chun Gao
(74) *Attorney, Agent, or Firm* — Leydig, Voit & Mayer, Ltd.

(57) ABSTRACT

This document discloses a system and method for verifying system integrity of an electronic device. The electronic device includes a verifier device provided within a secure environment of the electronic device and a scanner device provided within a normal environment of the electronic device whereby the secure environment comprises hardware that is isolated from the hardware in the normal environment, i.e. these two environments are hardware isolated.

20 Claims, 6 Drawing Sheets

(51) Int. Cl.
*G06F 21/57* (2013.01)
*G06F 21/83* (2013.01)

(56) References Cited

U.S. PATENT DOCUMENTS

| | | | |
|---|---|---|---|
| 8,051,097 B2 | 11/2011 | Betouin et al. | |
| 8,239,967 B2 | 8/2012 | McMichael et al. | |
| 2002/0194482 A1 | 12/2002 | Griffin et al. | |
| 2003/0200454 A1* | 10/2003 | Foster | G06F 21/575 726/17 |
| 2004/0177243 A1* | 9/2004 | Worley, Jr. | G06F 9/468 713/2 |
| 2005/0132217 A1 | 6/2005 | Srinivasan et al. | |
| 2005/0268093 A1* | 12/2005 | Proudler | G06F 21/575 713/164 |
| 2006/0005000 A1* | 1/2006 | King | G06F 21/552 713/1 |
| 2006/0085645 A1 | 4/2006 | Bangui | |
| 2006/0236122 A1 | 10/2006 | Field et al. | |
| 2009/0222910 A1 | 9/2009 | Le Bihan et al. | |
| 2010/0077473 A1 | 3/2010 | Ohta et al. | |
| 2012/0042376 A1 | 2/2012 | Dolgunov et al. | |
| 2012/0204266 A1 | 8/2012 | Yoo | |
| 2012/0255017 A1* | 10/2012 | Sallam | G06F 21/575 726/24 |
| 2013/0031374 A1* | 1/2013 | Thom | G06F 21/57 713/189 |
| 2013/0227264 A1 | 8/2013 | Kim et al. | |
| 2014/0066015 A1* | 3/2014 | Aissi | H04W 12/06 455/411 |
| 2015/0032976 A1 | 1/2015 | Chapier et al. | |
| 2015/0150127 A1* | 5/2015 | Ning | G06F 21/57 726/22 |
| 2015/0200934 A1* | 7/2015 | Naguib | G06F 21/575 713/2 |
| 2015/0264021 A1 | 9/2015 | Schulz et al. | |
| 2015/0317481 A1 | 11/2015 | Gardner et al. | |
| 2015/0370726 A1 | 12/2015 | Hashimoto et al. | |
| 2015/0373046 A1* | 12/2015 | Sapello | H04L 63/145 726/23 |
| 2016/0210620 A1 | 7/2016 | Taveau et al. | |

FOREIGN PATENT DOCUMENTS

| | | | |
|---|---|---|---|
| CN | 100520670 C | 7/2009 | |
| CN | 101685487 A | 3/2010 | |
| CN | 103544434 A | 1/2014 | |
| CN | 104202168 A | 12/2014 | |
| CN | 104221028 A | 12/2014 | |
| CN | 104598838 A | 5/2015 | |
| CN | 104809413 A | 7/2015 | |
| CN | 105468980 A | 4/2016 | |
| EP | 1076279 A1 | 2/2001 | |
| EP | 2166478 A2 * | 3/2010 | G06F 21/52 |
| EP | 2166478 A2 | 3/2010 | |
| EP | 2448215 A1 | 5/2012 | |
| JP | 2006164184 A | 6/2006 | |
| JP | 2009104258 A | 5/2009 | |
| JP | 2016009884 A | 1/2016 | |
| JP | 2016010031 A | 1/2016 | |
| KR | 20150059564 A | 6/2015 | |
| WO | 2006134304 A2 | 12/2006 | |
| WO | 2011146305 A2 | 11/2011 | |
| WO | 2015196381 A1 | 12/2015 | |

OTHER PUBLICATIONS

Ezzeddine et al., "Issues in Trustworthy Software Systems," IEEE Trustcom/BigDataSE/ISPA, pp. 1142-1147, Institute of Electrical and Electronics Engineers, New York, New York (2015).
"Knox Workplace," Samsung, https://www.samsungknox.com/en/products/knox-workspace/technical. (Retrieved from Internet on Nov. 14, 2017).
"Obfuscation (software)," Wikipedia, the free encyclopedia, https://en.wikipedia.org/wiki/Obfuscation_(software). (Retrieved from Internet on Nov. 14, 2017).
KR/10-2017-7029460, Office Action, dated Oct. 8, 2019.

* cited by examiner

SYSTEM AND METHOD FOR VERIFYING INTEGRITY OF AN ELECTRONIC DEVICE

CROSS-REFERENCE TO RELATED APPLICATIONS

This application is a continuation of International Application No. PCT/SG2017/050102, filed on Mar. 3, 2017, which claims priority to Singapore Patent Application No. 10201602449P, filed on Mar. 29, 2016. The disclosures of the aforementioned applications are hereby incorporated by reference in their entireties.

TECHNICAL FIELD

This application relates to a system and method for verifying system integrity of an electronic device. The electronic device includes a verifier module provided within a secure environment of the electronic device and a scanner module provided within a normal environment of the electronic device whereby the secure environment comprises hardware that is isolated from the hardware in the normal environment, i.e. these two environments are hardware isolated. During the integrity verification of the electronic device, the verifier module verifies the integrity of both the scanner module and the operating system installed in the normal environment.

BACKGROUND

Unauthorized modifications made to an electronic device with the objective of gaining super-user and/or administrator access or the removal of all user limitations from the electronic device, e.g. rooting for Android operating systems or jail breaking for iphone operating systems, renders the electronic device vulnerable to security breaches and compromises the overall security of the device. Critical or privileged modules in electronic devices include system critical processes or system management daemons that are executed within a device's Operating System (OS) kernel or within the device's system.

Most unauthorized modifications to an electronic device will leave some trace in the operating system of the device. For example, in Linux devices, when such a device is rooted, the rooting process will create a SU command module (i.e. a module that enables unauthorized applications to obtain higher privileges) or will escalate privileges accorded to certain processes. Hence, a method of verifying whether a device has been rooted involves scanning the device for SU command modules or for the escalation of privileges of certain processes. Other ways of verifying the integrity of the device involves checking the device's file system, checking fixed memory locations for certain kernel codes or checking a dynamic portion of the device's memory for unknown processes that have root/system privileges. Unsurprisingly, malicious attackers will adapt to these scanning techniques and will constantly come up with new ways to cover their tracks thereby avoiding detection.

A common problem faced by such anti-malware solutions is that the detection/protection programs are usually installed in the operating system that is to be protected. Therefore, if the attacker is aware of the existence of such anti-malware solutions running in the system, the attackers may implement an attack that causes the anti-malware solution to be modified thereby effectively disabling the usefulness of the solution. In short, anti-malware solutions installed within the normal operating space are always vulnerable to well-designed attacks.

A proposed method for determining integrity of a device involves periodically checking the device kernel's data against data contained within an original kernel. The module that performs this method is provided within a secure state of the device. Verification modules are typically installed within such secure areas because in theory, only super-users or system administrators may access or make modifications to modules provided in this area. This ensures that modules installed within such secure areas will be isolated from attacks and unauthorized modifications.

A solution known in the art that does this is the Trust Zone-based Integrity Measurement Architecture (TIMA) solution. The TIMA solution runs in a trusted environment entirely as a result, no attacks may modify the TIMA mechanism. However, as applications installed within the normal operating system are not utilized in the TIMA solution, this means that the TIMA solution can only check for simple attack traces. For example, it is only able to check whether the kernel code has been modified (i.e. by computing a digital hash of a known memory region and comparing the result to a predetermined value), and is only able to verify the signature of modules with a secret key stored in the trusted environment. As a result, it is not able to detect complex changes to the device or operating system of the device such as data that has been modified, process privilege that have been changed and etc. In fact, there are some known attack tools, for example, "towelroot", "pingpong root" and "kingroot" that can be used to attack TIMA implemented devices without being detected. In addition, it is much more difficult to implement updates to applications or modules that are installed within the trusted environment. As result, these modules in the trusted environment won't be able to handles the latest attacks due to the inefficiencies and difficulties in the updating of these modules.

Other proposed methods for verifying integrity of a device or preventing a device from attacks involve utilizing information that is constantly updated by a remote server. By analysing attack samples, the remote server is able to improve the accuracy and efficiency of the verification/protection processes and this updated information is periodically updated into the device. Secure boot/trusted boot/dm-verity are other solutions that rely on the idea that, if only verified components are allowed to be loaded and run in the system, most, if not all, attacks may be detected and addressed. To achieve this, these solutions require the to-be-loaded modules to be verified by a preinstalled module; whereby the preinstalled module is initially verified by hardware verification modules. In addition, the secure boot solution also ensures that critical components will be executed upon system start up, using a technique known as "boot-chain". For example, in Linux operating systems, a proposed secure boot-chain solution implements the following booting sequence when the device initially powers on:

1) The device's processor will load a boot-loader program from a predetermined location that is not editable after the device has been manufactured;
2) The boot-loader program will verify and load a "u-boot", or a universal boot-loader, that handles the basic input and output processes of the device, similar to what a BIOS does for personal computers; and
3) The u-boot will then load a kernel, which loads the Android system.

The secure boot solution proposed above allows verifications to be carried out using hardware components. However, these verifications are only carried out when the modules are initially loaded, and no further verification steps are carried out beyond that. As a result, this solution does not protect an operating system against run-time attacks such as the abovementioned attack tools.

For the above reasons, those skilled in the art are constantly striving to come up with a system and method to verify system integrity of an electronic device in an efficient and reliable manner.

SUMMARY

The above and other problems are solved and an advance in the art is made by systems and methods provided by embodiments in accordance with the application.

A first advantage of some embodiments of systems and methods in accordance with the application is that prior to verifying the integrity of the electronic device's system, the integrity of the scanner module provided within the device's normal operating system will be verified by a verification module installed within the device's trusted environment. This additional verification layer ensures the reliability of the system is not jeopardized.

A second advantage of some embodiments of systems and methods in accordance with the application is that the verification of the scanner module's integrity (whereby this module is provided within the normal operating system) may be combined with the step of verifying the device's system integrity thereby negating the need for additional time consuming verification steps.

A third advantage of some embodiments of systems and methods in accordance with the application is that the response generated by the scanner module may not be falsified, hacked or altered as the response is encrypted using an encryption method that may only be decrypted by the verification module.

A fourth advantage of some embodiments of systems and methods in accordance with the application is that the verification of the device's system integrity may be periodically carried out and not limited to only when the device powers-up or boots-up.

A fifth advantage of some embodiments of systems and methods in accordance with the application is that unlike the verification module, as the scanner module is installed in the normal environment, the scanner module may be easily and constantly updated with the latest anti-malware, anti-rooting or anti-jailbreak programs.

The above advantages are provided by some embodiments of a method in accordance with the application operating in the following manner.

According to a first aspect of the application, a method for verifying system integrity of an electronic device comprises the steps of generating, by a verifier module provided within a secure environment in the electronic device, a challenge; transmitting the challenge from the verifier module to a scanner module provided within a normal environment in the electronic device, wherein the challenge instructs the scanner module to execute an integrity verification function in the normal environment to generate a response; encrypting, by the scanner module, the response and transmitting the encrypted response to the verifier module; and verifying, by the verifier module, integrity of the scanner module whereby in response to a determination that the integrity of the scanner module is verified, determining, by the verifier module, whether the response is valid, whereby in response to a determination that the response is invalid, performing a mitigation action.

With reference to the first aspect, in a first possible implementation manner of the first aspect, the step of verifying the integrity of the scanner module comprises decrypting, by the verifier module, the encrypted response, whereby in response to a successful decryption of the encrypted response, verifying the integrity of the scanner module.

With reference to the first aspect or the first possible implementation manner of the first aspect, in a second possible implementation manner of the first aspect, the secure environment in the electronic device comprises a secure world virtual processor for the electronic device.

With reference to the first aspect, the first or second possible implementation manners of the first aspect, in a third possible implementation manner of the first aspect, the normal environment in the electronic device comprises a normal world virtual processor for the electronic device.

With reference to the first aspect, the first, second or third possible implementation manners of the first aspect, in a fourth possible implementation manner of the first aspect, the verification function comprises scanning a kernel code; scanning a process list; scanning a memory page table; or checking a status and parameter of kernel protection mechanism.

With reference to the first aspect, the first, second, third or fourth possible implementation manners of the first aspect, in a fifth possible implementation manner of the first aspect, the encrypting the response comprises encrypting the response with a private or a public key, wherein the private or public key is provided in the scanner and verifier modules.

With reference to the first aspect, or the first, second, third, fourth or fifth possible implementation manners of the first aspect, in a sixth possible implementation manner of the first aspect, the determining if the response is valid comprises matching the response with data contained in a secure database provided in the secure environment, wherein when a match is not found, the response is determined as invalid.

With reference to the first aspect, or the first, second, third, fourth, fifth or sixth possible implementation manners of the first aspect, in a seventh possible implementation manner of the first aspect, wherein before the step of generating the challenge using the verifier module, the method comprises verifying, by the verifier module, integrity of the scanner module provided within the normal environment.

With reference to the seventh possible implementation manner of the first aspect, in an eighth possible implementation manner of the first aspect, the verifying the integrity of the scanner module provided within the normal environment comprises generating, by the verifier module, a verification response request and transmitting the verification response request from the verifier module to a scanner module, wherein the verification response request instructs the scanner module to generate an encrypted verification response, and transmit the encrypted verification response to the verifier module; and determining, by the verifier module, whether the encrypted verification response is valid, whereby in response to a determination that the response is invalid, performing the mitigation action.

With reference to the eighth possible implementation manner of the first aspect, in a ninth possible implementation manner of the first aspect, the determining whether the encrypted verification response is valid comprises decrypting, by the verifier module, the encrypted verification response, whereby in response to a determination that the verification response is decrypted, matching the decrypted verification response with verification data contained in a secure database provided in the secure environment, wherein when a match is not found, the verification response is determined as invalid.

With reference to the first aspect, or the first, second, third, fourth, fifth, sixth or seventh possible implementation manners of the first aspect, in a tenth possible implementation manner of the first aspect, the mitigation action comprises preventing execution of software modules provided in the normal environment.

With reference to the first aspect of the application, in an eleventh possible implementation manner of the first aspect, the secure environment is hardware isolated from the normal environment.

With reference to the first aspect, or the first, second, third or fourth possible implementation manners of the first aspect, in a twelfth possible implementation manner of the first aspect, the verification function in the scanner module is obfuscated.

With reference to the first aspect of the application, in an thirteenth possible implementation manner of the first aspect, wherein before the step of generating the challenge using the verifier module, the method comprises detecting, by the electronic device, a power-on of the electronic device; and loading the verified module in the secure environment in the electronic device.

With reference to the first aspect of the application, or the thirteenth possible implementation manner of the first aspect, in a fourteenth possible implementation manner of the first aspect, the method further comprises determining whether a preset time interval has lapsed; and repeating the method for verifying the system integrity of the electronic device when the preset time interval has lapsed.

According to a second aspect of the application, A system for verifying system integrity of an electronic device, the system comprising: a processing unit having a secure environment and a normal environment; and a non-transitory media readable by the processing unit, the media storing instructions that when executed by the processing unit cause the processing unit to:

generate a challenge using a verifier module provided within the secure environment;

transmit the challenge from the verifier module to a scanner module provided within the normal environment, wherein the challenge instructs the scanner module to execute an integrity verification function in the normal environment to generate a response;

encrypt the response using the scanner module, and transmit the encrypted response to the verifier module; and verify an integrity of the scanner module using the verifier module, whereby in response to a determination that the integrity of the scanner module is verified, to determine using the verifier module whether the response is valid, whereby in response to a determination that the response is invalid, to perform a mitigation action.

With reference to the second aspect, in a first possible implementation manner of the second aspect, t wherein the instructions to verify the integrity of the scanner module comprises:

instructions for directing the processing unit to:

decrypt the encrypted response using the verifier module, whereby in response to a successful decryption of the encrypted response, to verify the integrity of the scanner module.

With reference to the second aspect or the first possible implementation manner of the second aspect, in a second possible implementation manner of the second aspect, wherein the secure environment in the processing unit comprises a secure world virtual processor.

With reference to the second aspect, the first or second possible implementation manners of the second aspect, in a third possible implementation manner of the second aspect, wherein the normal environment in the processing unit comprises a normal world virtual processor.

With reference to the second aspect, the first, second or third possible implementation manners of the second aspect, in a fourth possible implementation manner of the second aspect, wherein the verification function comprises:

instructions for directing the processing unit to:

scan a kernel code; scan a process list; scan a memory page table; or check a status and parameter of a kernel protection mechanism.

With reference to the second aspect, the first, second, third or fourth possible implementation manners of the second aspect, in a fifth possible implementation manner of the second aspect, wherein the instructions to encrypt the response comprises:

instructions for directing the processing unit to:

encrypt the response with a private or a public key, wherein the private or public key is provided in the scanner and verifier modules.

With reference to the second aspect, or the first, second, third, fourth or fifth possible implementation manners of the second aspect, in a sixth possible implementation manner of the second aspect, wherein the instructions to determine if the response is valid comprises:

instructions for directing the processing unit to:

match the response with data contained in a secure database provided in the secure environment, wherein when a match is not found, the response is determined as invalid.

With reference to the second aspect, or the first, second, third, fourth, fifth or sixth possible implementation manners of the second aspect, in a seventh possible implementation manner of the second aspect, wherein before the instructions to generate the challenge using the verifier module, the instructions comprises:

instructions for directing the processing unit to:

verify integrity of the scanner module provided within the normal environment using the verifier module provided within the secure environment.

With reference to the seventh possible implementation manner of the second aspect, in an eighth possible implementation manner of the second aspect, wherein the instructions to verify the integrity of the scanner module provided within the normal environment comprises:

instructions for directing the processing unit to:

generate a verification response request using the verifier module and to transmit the verification response request from the verifier module to the scanner module, wherein the verification response request instructs the scanner module to generate an encrypted verification response, and transmit the encrypted verification response to the verifier module; and determine whether the encrypted verification response is valid using the verifier module, whereby in response to a determination that the response is invalid, to perform the mitigation action.

With reference to the eighth possible implementation manner of the second aspect, in a ninth possible implementation manner of the second aspect, wherein the instructions to determine if the encrypted verification response is valid comprises:

instructions for directing the processing unit to:

decrypt the encrypted verification response using the verifier module, whereby in response to a determination that the verification response is decrypted, to match the decrypted verification response with verification data contained in a secure database provided in the secure environment, wherein when a match is not found, the verification response is determined as invalid.

With reference to the second aspect, or the first, second, third, fourth, fifth, sixth or seventh possible implementation manners of the second aspect, in a tenth possible implementation manner of the second aspect, wherein the mitigation action comprises:

instructions for directing the processing unit to prevent execution of software modules provided in the normal environment.

With reference to the second aspect of the application, in an eleventh possible implementation manner of the second aspect, wherein the secure environment is hardware isolated from the normal environment.

With reference to the second aspect, or the first, second, third or fourth possible implementation manners of the second aspect, in a twelfth possible implementation manner of the second aspect, wherein the verification function in the scanner module is obfuscated.

With reference to the second aspect of the application, in an thirteenth possible implementation manner of the second aspect, wherein before the instructing to generate the challenge using the verifier module, the system comprises:

instructions for directing the processing unit to:

detect a power-on of the electronic device; and load the verified module in the secure environment in the electronic device.

With reference to the second aspect of the application, or the thirteenth possible implementation manner of the second aspect, in a fourteenth possible implementation manner of the second aspect, the scanner module is obfuscated.

BRIEF DESCRIPTION OF DRAWINGS

The above advantages and features in accordance with this application are described in the following detailed description and are shown in the following drawings.

DESCRIPTION OF EMBODIMENTS

This application relates to a system and method for verifying system integrity of an electronic device. The electronic device is provided with a verifier module installed within a secure environment of the electronic device and a scanner module installed within a normal environment of the electronic device whereby the secure environment comprises hardware that is isolated from the hardware in the normal environment, i.e. these two environments are hardware isolated.

Figure 1:
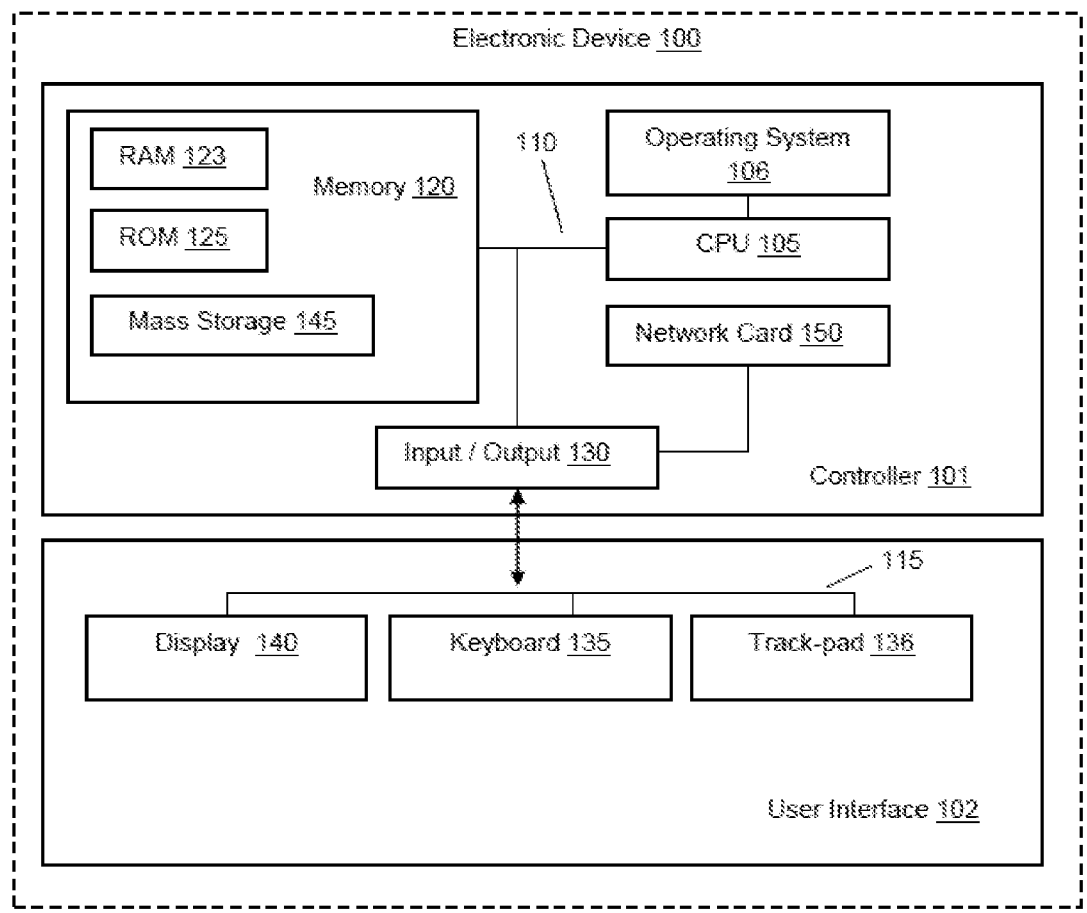
FIG. 1 illustrating a block diagram representative of components in an electronic device for implementing embodiments in accordance with embodiments of the application.

FIG. 1 illustrates a block diagram showing a processing system and components of the processing system that may be included in electronic device 100 for implementing embodiments in accordance with embodiments of the application. Electronic device 100 may include, but is not limited to, any device that is able to carry out communicative functions such as a smart phone, a tablet computer, a mobile computer, a netbook, a wearable electronic device such as smart watch, and etc. One skilled in the art will recognize that the exact configuration of each electronic device may be different and the exact configuration each electronic device may vary and FIG. 1 is given by way of example only.

In embodiments of the application, electronic device 100 comprises controller 101 and user interface 102. User interface 102 is arranged to enable manual interactions between a user and electronic device 100 and for this purpose includes the input/output components required for the user to enter instructions to control electronic device 100. A person skilled in the art will recognize that components of user interface 102 may vary from embodiment to embodiment but will typically include one or more of display 140, keyboard 135 and track-pad 136.

Controller 101 is in data communication with user interface 102 via bus 115 and includes memory 120, Central Processing Unit (CPU) 105 mounted on a circuit board that processes instructions and data for performing the method of this embodiment, an operating system 106, an input/output (I/O) interface 130 for communicating with user interface 102 and a communications interface, in this embodiment in the form of a network card 150. Network card 150 may, for example, be utilized to send data from electronic device 100 via a wired or wireless network to other processing devices or to receive data via the wired or wireless network. Wireless networks that may be utilized by network card 150 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 120 and operating system 106 are in data communication with CPU 105 via bus 110. The memory components include both volatile and non-volatile memory and more than one of each type of memory, including Random Access Memory (RAM) 120, Read Only Memory (ROM) 125 and a mass storage device 145, the last comprising one or more solid-state drives (SSDs). One skilled in the art will recognize that the memory components comprise non-transitory computer-readable media and shall be taken to comprise all computer-readable media except for a transitory, propagating signal. Typically, the instructions are stored as program code in the memory components but can also be hardwired. Memory 120 may include a kernel and/or programming modules such as a software application that may be stored in either volatile or non-volatile memory.

Herein the term "CPU" is used to refer generically to any device or component that can process such instructions and may include: a microprocessor, microcontroller, programmable logic device or other computational device. That is, CPU 105 may be provided by any suitable logic circuitry for receiving inputs, processing them in accordance with instructions stored in memory and generating outputs (for example to the memory components or on display 140). In this embodiment, CPU 105 may be a single core or multi-core processor with memory addressable space. In one example, CPU 105 may be multi-core, comprising—for example—an 8 core CPU.

Figure 2:
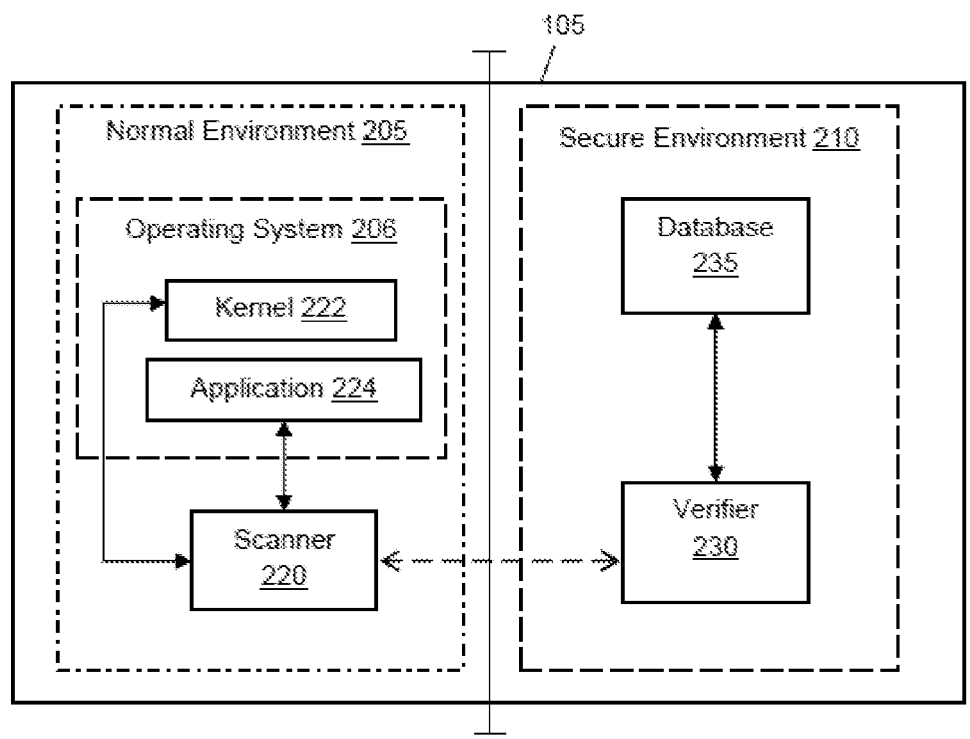
FIG. 2 illustrating an exemplary block diagram of a secure environment and a normal environment of a processor in accordance with embodiments of the application.

FIG. 2 illustrates an exemplary block diagram of processor 105 that has been configured to provide a secure environment virtual processor 210 (hereinafter known as "secure environment) and a normal environment virtual processor 205 (hereinafter known as "normal environment) in accordance with embodiments of the application. Normal environment 205 may include operating system 206, kernel 222, application 224 and scanner 220 that have been configured to operate in normal mode with minimal security settings. Conversely, secure environment 210 may be provided with a secure operating system, a secure kernel, a secure database 235 and secure verifier module 230.

Secure environment 210 may be hardware-separated from normal environment 205 thereby ensuring that applications, kernels, modules and operating systems located within the normal environment may not access applications, kernels, modules and operating systems provided within the secure environment. Such a hardware-based separation may be provided by, but are not limited to, processor architectures provided by Advanced RISC Machines (ARM). In ARM processors, such a hardware-based separation is implemented as Trust Zone technology. The Trust Zone technology of ARM processors enables hardware-based separation for dividing code execution on a single physical processor core into two environments, a secure environment and a normal environment. One skilled in the art will recognize that the software or modules illustrated in FIG. 2, such as the modules installed in secure 210 and normal 205 environments, may be written using development codes for such operating systems or may be modified from existing classes or components coded for such operating systems to perform the processes required by each module as described below and that data or information may be transferred between these modules as required.

Components installed within the secure environment are subject to strict security requirements and as result, may perform limited functions and may only be accessed or modified by manufacturers of the device or super-users of the device. This makes updating applications, modules or kernels within the secure environment a tedious and unpractical option.

Operating system 206 that is provided within normal environment 205 may include arbitrary operating systems such as Android, Linux, iPhone OS (iOS) or any other operating system suitable for use in electronic device 100 or mobile devices. Kernel 222 and/or application 224 may execute instructions to manage the resources of electronic device 100. Scanner module 220 which is provided within normal environment 205 may be configured to provide instructions or commands to operating system 206, kernel 222 or application 224 and may be also configured to receive responses from each of these components. However, it should be noted that the components in normal environment 205 may not access or control components that are provided within secure environment 210 such as database 235 or verifier 230. Components installed in the normal environment may however transmit data to or receive instructions from components installed in secure environment 210. The data transmitted from components of normal environment 205 may not include commands or instructions as data of such nature will not be processed by the components in secure environment 210.

Figure 3:
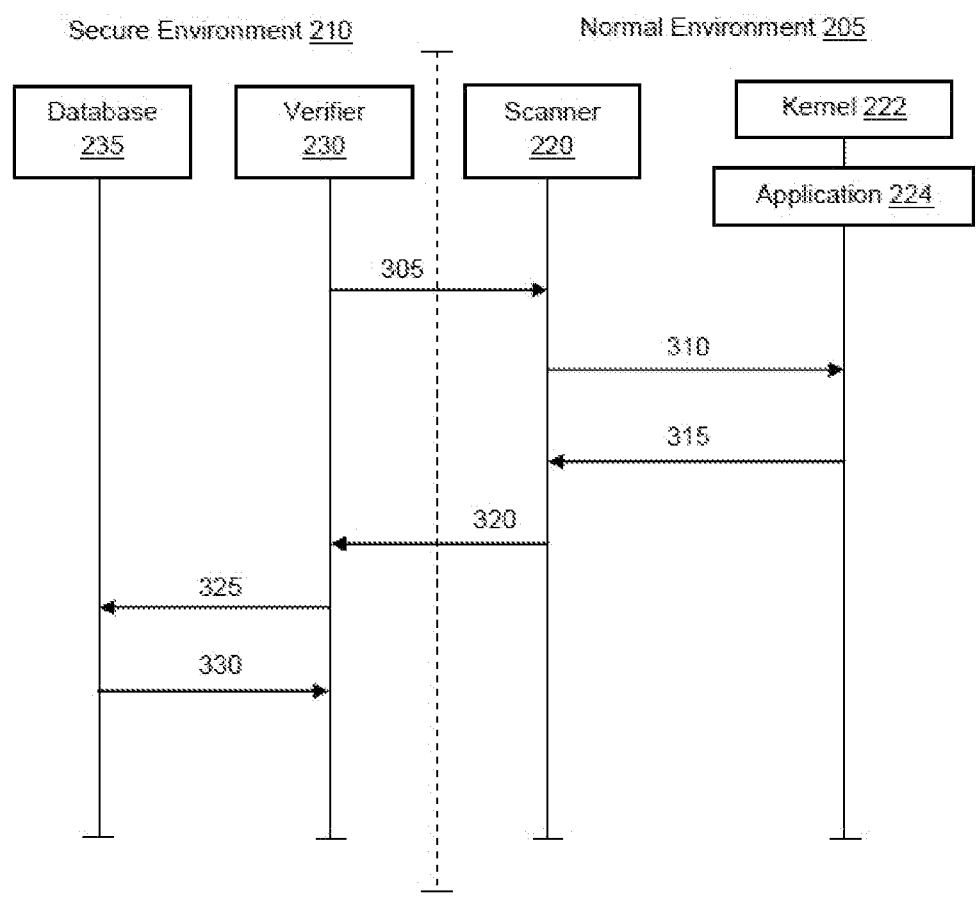
FIG. 3 illustrating a timing diagram for the verification of integrity of the electronic device in accordance with embodiments of the application.

FIG. 3 illustrates a timing diagram for the verification of the integrity of electronic device 100 in accordance with embodiments of the application. As illustrated previously in FIG. 2, verifier module 230 is provided within secure environment 210. Verifier module 210 may comprise an application or a secure program configured to generate instructions (hereinafter known as "challenges") or various types of requests, such as a verification request, that are then transmitted to components in normal environment 205. The system illustrated in FIG. 2 operates in the following manner. Verifier 230 will first generate a challenge which contains specific instructions that are to be carried out by scanner module 220. In embodiments of the application, this challenge may be encrypted using a public key or private key encryption whereby the corresponding public or private key has previously been provided to scanner module 220. The generated challenge is then transmitted to scanner module 220 at step 305. Upon receiving the challenge, scanner module 220 will carry out the instructions contained within the challenge. If the challenge has been encrypted, scanner module 220 will decrypt the challenge using the appropriate decryption key and will then carry out the instructions contained within. This ensures that the challenge, the instructions contained in the challenge and the scanning functions/targets specified in the instructions remain confidential from all other modules and/or processes.

The instructions may contain commands for scanner module 220 to execute steps to verify the integrity of operating system 206 and this may be done using the default features and functions provided by operating system 206. In embodiments of the application, the instructions may include, but are not limited to, commands for scanner module 220 to execute algorithms to scan code in kernel 222 for known malicious code, to scan a process list, to check memory 120 for rooting or jail-breaking traces, to scan the page table of memory 120, to check the status and privilege parameters of kernel 222 or application 224. All these integrity verification algorithms may be stored within scanner module 220. In embodiments of the application, the integrity verification algorithms contained within scanner module 220 and/or scanner module 220 may be obfuscated thereby preventing scanner module 220 and these codes from being retrieved and/or analysed by malicious attackers. It should be noted that an obfuscated scanner module 220 may still execute instructions received from verifier module 210. In other words, scanned module 220 does not need to be un-obfuscated before scanner module 220 is able to execute the received instructions. Hence, obfuscated scanner module 220 will always remain obfuscated all the time. By having the verification instructions encrypted and by having scanner module 220 obfuscated, this ensures that scanner module 220, which is provided within normal operating environment 205, is doubly shielded from unauthorized access from other modules in normal environment 205. One skilled in the art will recognize that new verification algorithms may be provided to scanner module 220 as new updates are developed to address newly discovered malicious code or attacks without departing from this application. These updates may be easily installed in scanner module 220 as scanner module is installed within normal operating environment 205. The execution of the integrity verification algorithms by scanner module 220 takes place at step 310.

After the verification functions have been carried out, the verification results and responses from the respective kernels, applications and/or modules will then be returned to scanner module 220. This takes place at step 315. The responses are all collated at scanner module 220 which then proceeds to encrypt the collated responses using a public or private key provided within scanner module 220. One skilled in the art will recognize that other encryption or possibly even obfuscation techniques may be utilized to encrypt the collated response without departing from this application. The encrypted collated response is then transmitted to verifier module 230 at step 320.

Verifier module 230 will then verify the integrity of scanner module 220 using the encrypted response. In embodiments of the application, if verifier module 230 is successful in decrypting the encrypted response, this means that the integrity of scanner module 220 has not been compromised as the same encryption key and/or algorithm was used to encrypt the response. In order to decrypt the encrypted response, verifier module 230 will have to retrieve the secret public/private key from secure database 235. This takes place in step 325.

Database 235 will analyze the request by verifier module 230 to determine whether the request is a valid request, i.e. whether the requested secret key is contained within its records. If the requested secret key is not available, this may trigger a warning that the integrity of the system has been compromised. Conversely, if the secret key may be successfully retrieved, this secret key is then forwarded to verifier module 230 at step 330.

Verifier module 230 will then utilize the secret key to decrypt the encrypted response. If the response may not be decrypted or if the decryption produces nonsensical results, this would strongly imply that scanner module 220 has been compromised and mitigation actions would then be carried out by verifier module 230. In embodiments of the application, the mitigation actions may include locking down the electronic device thereby preventing further applications from running, powering down the electronic device, and/or sending an alert to a remote server notifying the server that mitigation actions have been initiated on the electronic device. One skilled in the art will recognize that other mitigation steps may be taken without departing from this application. Alternatively, if the response is successfully decrypted, this means that the integrity of scanner module 220 is intact and the response is then further analyzed by verifier module 230.

Based on the commands contained within the earlier generated challenge, verifier module 230 will then retrieve the expected set of results from secure database 235. The results retrieved from database 235 are then compared with the results contained in the decrypted response. If both sets of results match or satisfy an internal checklist, the response is then determined as valid and verification module 230 then determines that the integrity of electronic device 100 has not been compromised. Alternatively, if the results do not match or if all the contents of the checklist are not met, this means that the integrity of electronic device 100 has been jeopardized and mitigation action has then to be performed by verifier module 230. As mentioned above, the mitigation actions that may be taken by verifier module 230 include, but are not limited to, locking down the electronic device thereby preventing further applications from running, powering down the electronic device, and/or sending an alert to a remote server notifying the server that mitigation actions have been initiated on the electronic device.

In an exemplary embodiment of the application, the system of the application may be implemented as an anti-rooting detection system for devices in Bring-Your-Own-Device (BYOD) systems. In BYOD systems, employees are permitted to view their company's confidential data using their own electronic devices. To ensure that the confidentiality of these data is not jeopardized, the company needs to ensure that the electronic device has an operating system (OS) that is intact, that is an OS that has not been rooted or jail-broken. In summary, the company needs to be sure that the security measures implemented by the device's operating system remains intact whereby the user is only granted limited access control privileges.

In this embodiment of the application, two programs or modules are first installed in the electronic device when the employee adds their device to the BYOD system. The first program or module is the verifier module that is to be installed in the device's Trusted Execution Environment (TEE) or its equivalent secure environment and the second program is the scanner module that is to be installed in the device's Rich Execution Environment (REE) or its equivalent normal environment.

The verifier module would contain a list of tasks that the verifier module may ask the scanner module to perform, for example, scan the kernel code, scan the process list, check for the SU module, scan the memory page table, check the status and parameters of an kernel protection mechanism and many others. These tasks may be selected using a request sender program provided within verifier module whereby this program sends the verification request or challenges containing the set of objectives/commands to the scanner module. In embodiments of the application, the request sender program may be provided with a timer and a function call-back handler, so that the request sender program may start periodically and/or when critical BYOD functions are about to initiate.

The verifier module may also contain a private key (it can be a symmetric decryption key as well) that can be used by a verification algorithm to decrypt and validate the response sent back by the scanner module. In addition to the above, the verifier module also includes a response handler that is configured to perform mitigation actions such as locking the phone, shutting down the phone and/or notifying a response authority in response to receiving an invalidated response or unsuccessful decryption of the response.

The scanner module that is installed in the REE environment includes a public key (it can be a symmetric encryption key as well) that may be used to encrypt the response that is to be sent to the verifier module and the public key may be protected by obfuscation and white-box techniques. The scanner module also contains a set of scanning algorithms that are used to carry out the instructions or commands received from the verifier module, and these algorithms may also be obfuscated. The scanner module also includes a responding algorithm that utilizes the public key to encrypt the results of the scanning algorithms before sending the encrypted results back to the verifier. In embodiments of the application, the scanner module is implemented as a system module of the operating system, for example if the operating system is an Android operating system; the scanner module will be implemented as an Android system module which may be loaded by the Android kernel.

In embodiments of the application, the verifier module may be loaded automatically each time the electronic device boots-up or powers-up (before or right after universal-boot is loaded). This boot sequence is similar to the secure boot chain technique known in the art. After the verifier module has been loaded, it stays in the TEE of the device and thus it is shielded from applications installed in the REE by hardware isolation. This means that malicious attackers cannot unload the module or modify its settings as the verifier module is running. Similarly, the secure boot chain will load the scanner module in the REE or normal environment after it loads the kernel in the REE. Right after the scanner module has been loaded and before the operating system is loaded, the scanner module will scan the kernel and send to the verifier a reference of the correct kernel. After that, the operating system in the REE is loaded and executes as normal.

In other embodiments of the application, the verifier module may be executed periodically with a random time interval between 5 minutes to 1 hour. This means that the verifier module will periodically request the scanner module to do a system integrity scan. Steps 305-330 as shown in FIG. 3 are carried out during this system integrity scan. The random interval is adjusted to achieve a balance between the device's performance and the device's security. To further improve efficiency, the verifier module may adjust the execution time intervals based on the power status of the device, the charge status of the device, the device's CPU workloads, the time of the day etc. It should be noted that all the necessary information required by the verifier module may be obtained from the kernel and applications contained within the TEE or the secure environment of the device.

In another exemplary embodiment of the application, the system of the application may be implemented as a pre-online transaction system that validates the device's integrity before online transaction applications may be carried out between the electronic device and a financial institute. In this embodiment, the system ensures that sensitive data such as financial data contained in the device is protected during online transactions. Further, the system will also ensure that the transaction is indeed authorized by the user. Still further, in this embodiment, the system will also verify that a key-logger application is not running in the device's system trying to steal the user's password or any other sensitive information.

Similarly, the verifier module is installed in the device's Trusted Execution Environment (TEE) or its equivalent secure environment and the scanner module is installed in the device's Rich Execution Environment (REE) or its equivalent normal environment.

In this embodiment, before the verifier generates and transmits a challenge to the scanner module, i.e. before step 305, the verifier module will first verify the integrity of the scanner module. This can be done by verifying a digital signature of the scanner module, or by checking the memory content of the scanner module. For example, the corresponding financial institute will have a private key that is used to compute a digital signature of approved scanner modules, and the verifier module will have a corresponding public key that is used to verify that the scanner module is indeed the correct version that has been digitally signed by the bank. The public key is typically stored in the secure database provided in the TEE. Whenever the programs associated with the financial institute requires the scanner module to be updated (for example, to support new functionality, or to edit the allowed process list, etc.), the financial institute will release a new version of the scanner module together with the corresponding digital signature (e.g. via online portals). The user will then have to download and install the updates on their device. The verifier will periodically check the integrity of the scanner module using the module's digital signature so as to prevent the user's confidential data (e.g. passwords) from being logged or captured via new malicious programs/attacks. As the verifier module is much more difficult to update, the new verification objectives are added to the scanner module in such a way that the original verifier module is still able validate the response of the updated scanning actions carried out by the scanner module. One example on how this can be achieved is that, the responses from the scanner module will contain the expected results that have been digitally signed using the banks private key.

In the event the integrity of the scanner module has been compromised or if the responses generated by the scanner module have not been validated, i.e. the system has been jeopardized, the verifier module will carry out mitigation actions such as notifying the financial institute that the integrity of the corresponding module or system has been compromised. In some scenarios, even upon receiving such a notification from the device, the transaction may still be allowed to proceed if the financial institute determines that the risk is acceptable. Hence, in order for the financial institute to carry out a proper threat assessment analysis, the verifier module will also have to provide details about the integrity verification error, e.g. details about applications that are running, objectives that were not met, results that were returned from the scanner module, etc., when transmitting the notification to the financial institute.

In accordance with an embodiment of the application, a method for verifying system integrity of an electronic device comprises the following four steps:

Step 1, generating, by a verifier module provided within a secure environment in the electronic device, a challenge;

Step 2, transmitting the challenge from the verifier module to a scanner module provided within a normal environment in the electronic device, wherein the challenge instructs the scanner module to execute an integrity verification function in the normal environment to generate a response;

Step 3, encrypting, by the scanner module, the response and transmitting the encrypted response to the verifier module; and Step 4, verifying, by the verifier module, integrity of the scanner module whereby in response to a determination that the integrity of the scanner module is verified, determining, by the verifier module, if the response is valid, whereby in response to a determination that the response is invalid, performing a mitigation action.

In order to provide such a system or method, a process is needed for verifying system integrity of an electronic device using a verifier module installed within a secure environment of the device and a scanner module installed within a normal environment of the device. The following description and FIGS. 4-6 describe embodiments of processes that provide processes in accordance with this application.

Figure 4:
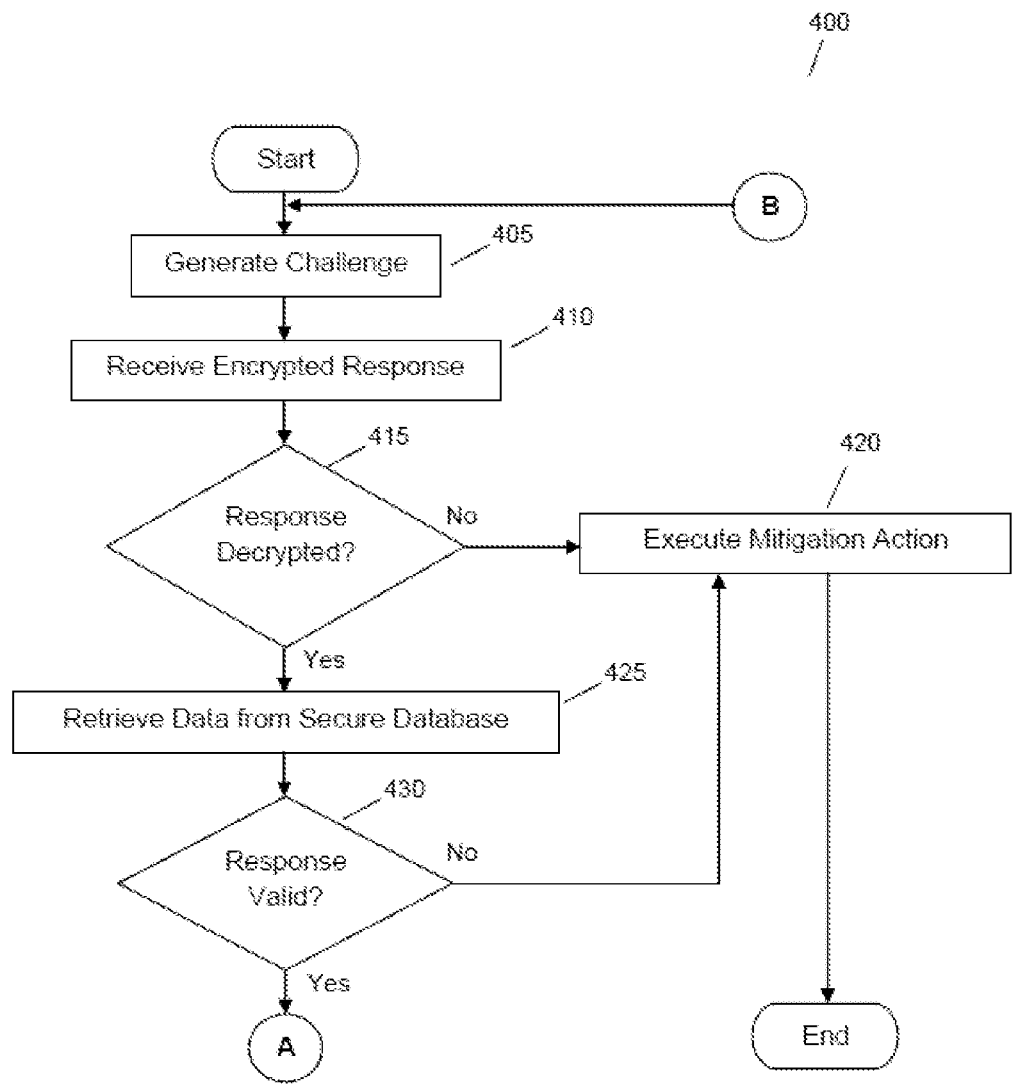
FIG. 4 illustrating a flow diagram of a process carried out at a verification module for the integrity verification of the electronic device in accordance with embodiments of the application.

FIG. 4 illustrates process 400 that is performed by a verifier module installed within a secure environment of an electronic device to verify the device's system integrity in accordance with embodiments of this application. Process 400 begins at step 405 by generating a challenge that is to be transmitted to scanner module provided within a normal environment of the electronic device. The challenge will contain specific instructions that are to be carried out by the scanner module to validate the integrity of the system. Once the challenge has been generated, the challenge is then transmitted and executed by the scanner module. Process 400 then receives an encrypted response from the scanner module at step 410. The response is then decrypted by process 400 at step 415. Process 400 may decrypt the encrypted response using a private and/or public key stored within verifier module or process 400 may retrieve the necessary secret key from a secure database provided within the secure environment. If the encrypted response is not successfully decrypted, process 400 proceeds to step 420 whereby process 400 then proceeds to carry out the necessary mitigation actions. Process 400 then ends.

Alternatively, if the response has been successfully decrypted at step 415, process 400 will proceed to step 425. At step 425, process 400 will review to response to determine the required data or checklist that is to be retrieved from the secure database. Process 400 will then compare the retrieved data with the data contained within the decrypted response to determine the validity of the response. This takes place at step 430. If process 400 determines that the response is valid, this means that the integrity of the system is intact and process 400 proceeds to step A. Conversely, if the response is determined to be invalid, process 400 proceeds to step 420 instead whereby mitigation actions are performed by process 400. Process 400 then ends.

In further embodiments of the application, if the verifier module receives an indication at step A that the electronic device has powered down and is powering up (i.e. booting up), the verifier module will launch first, before any other processes are executed and will perform process 400. Process 400 then will cause steps 405-430 to be repeated before the kernel or operating system in the normal environment may be launched. In yet another embodiment of the application, at step A, after a pre-set time interval or period has lapsed, process 400 will cause steps 405-430 to be repeated to verify the system integrity of the electronic device.

Figure 5:
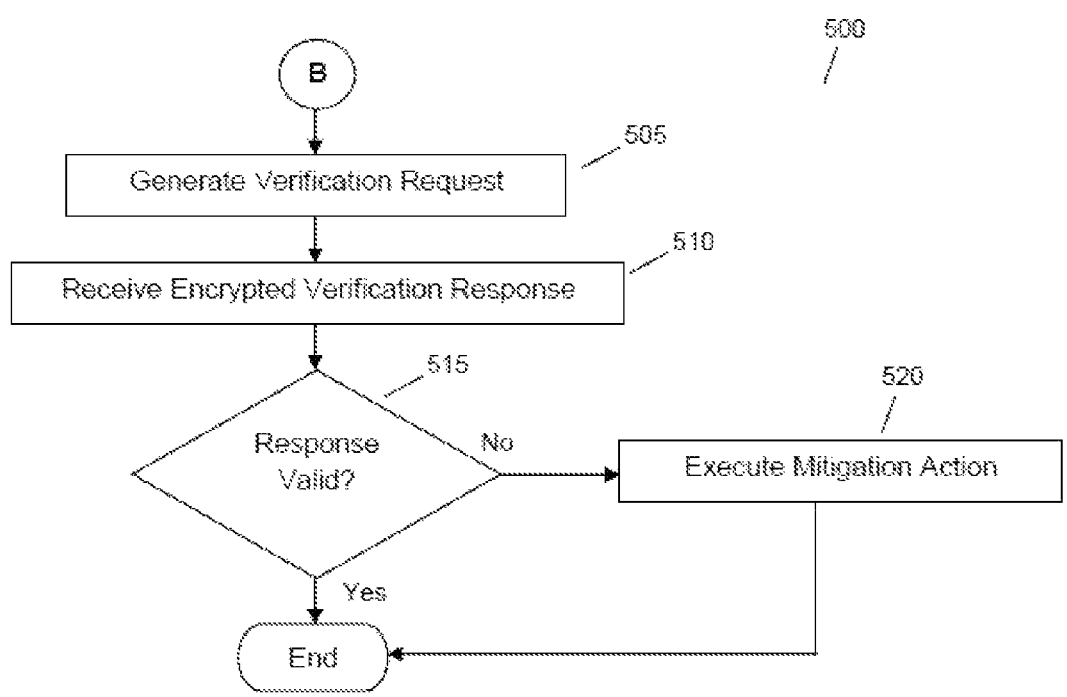
FIG. 5 illustrating a flow diagram of a process for verifying integrity of the scanner module provided within the normal environment in accordance with embodiments of the application.

In another embodiment of the application, before process 400 generates the challenge at step 405, process 400 will first verify the integrity of the scanner module that is installed in the normal environment. This pre-challenge verification step takes place at step B in FIG. 4. FIG. 5 illustrates process 500 that is performed by the verifier module to verify the scanner module's integrity in accordance with embodiments of this application. Process 500 begins at step 505 whereby a verification response request is generated. The verification response request will cause the scanner module to generate an encrypted response using a secret key (e.g. private or public key) known to both the verifier and scanner modules. Once the request has been generated, the request is then transmitted to the scanner module. The scanner module will then carry out the instructions contained within the received request. Process 500 then receives the encrypted verification response from the scanner module at step 510. Process 500 then proceeds to validate the received response at step 515. The validation of the response may involve the decryption of the encrypted response whereby if the response is successfully decrypted, this implies to process 500 that the response is valid. Conversely, if the response cannot be successfully decrypted, this indicates that the response is invalid. If the response is determined by process 500 to be valid at step 515, process 500 then ends. However, if the response is determined to be invalid at step 515, process 500 will proceed to step 520 whereby mitigation actions will be carried out. Process 500 then ends.

Figure 6:
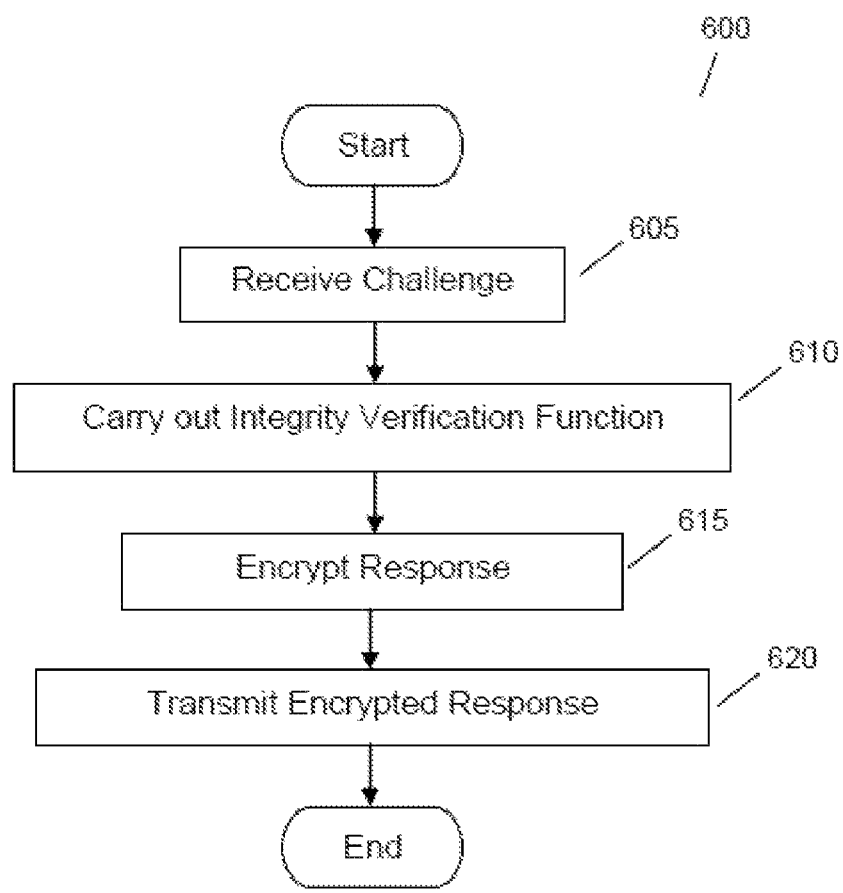
FIG. 6 illustrating a flow diagram of a process carried out at a scanner module for generating an encrypted response for the verification of the scanner module and the integrity of the electronic device in accordance with embodiments of the application.

FIG. 6 illustrates process 600 that is performed by a scanner module installed within a normal environment of the electronic device for generating an encrypted response for the verification of the scanner module and the integrity of the electronic device in accordance with embodiments of the application. Process 600 begins at step 605 whereby process 600 receives the challenge from the verifier module. To recap, the challenge will contain all the verification steps that are to be executed by process 600. Process 600 then proceeds to execute all the verification functions as indicated in the challenge at step 610. After each function has been completed, process 600 will collect the response generated for each particular function and collate all the responses into a single unified response. The unified responses are then encrypted using a secret key (e.g. private key or public key) at step 615. This encrypted response is then transmitted to verifier module at step 620 and process 600 then ends.

The above is a description of embodiments of a system and process in accordance with the present application as set forth in the following claims. It is envisioned that others may and will design alternatives that fall within the scope of the following claims.

What is claimed is:

1. A method for verifying system integrity of an electronic device, the method comprising:
   generating, by a verifier device provided within a secure environment in the electronic device, a challenge;
   transmitting the challenge from the verifier device to a scanner device provided within a normal environment in the electronic device;
   executing, by the scanner device an integrity verification function in the normal environment to generate a response, wherein the scanner device is instructed by the challenge to execute the integrity verification function;
   encrypting, by the scanner device, the response and transmitting the encrypted response to the verifier device; and
   verifying, by the verifier device, the integrity of the scanner device;
   determining, in response to a determination that the integrity of the scanner device is verified, by the verifier device, whether the response is valid; and
   performing, in response to a determination that the response is invalid, a mitigation action.

2. The method according to claim 1, wherein the verifying the integrity of the scanner device comprises:
   decrypting, by the verifier device, the encrypted response, and in response to a successful decryption of the encrypted response, verifying the integrity of the scanner device.

3. The method according to claim 1, wherein the verification function comprises at least one of:
   scanning a kernel code;
   scanning a process list;
   scanning a memory page table; and
   checking a status and parameter of a kernel protection mechanism.

4. The method according to claim 1 wherein the determining whether the response is valid comprises:
   matching the response with data contained in a secure database provided in the secure environment, wherein when a match is not found, the response is determined as invalid.

5. The method according to claim 1 wherein before the step of generating the challenge using the verifier device, the method comprises:
   verifying, by the verifier device, integrity of the scanner device provided within the normal environment.

6. The method according to claim 5 wherein the verifying the integrity of the scanner device provided within the normal environment comprises:
   generating, by the verifier device, a verification response request and transmitting the verification response request from the verifier device to the scanner device, wherein the verification response request instructs the scanner device to generate an encrypted verification response, and transmit the encrypted verification response to the verifier device;

determining, by the verifier device, whether the encrypted verification response is valid; and performing, in response to a determination that the response is invalid, the mitigation action.

7. The method according to claim 6, wherein the determining whether the encrypted verification response is valid comprises:

decrypting, by the verifier device, the encrypted verification response;

matching, in response to a determination that the verification response is decrypted, the decrypted verification response with verification data contained in a secure database provided in the secure environment, wherein when a match is not found, the verification response is determined as invalid.

8. The method according to claim 1, wherein the mitigation action comprises:

preventing execution of software devices provided in the normal environment.

9. The method according to claim 1, wherein the secure environment in the electronic device comprises a secure world virtual processor for the electronic device, the normal environment in the electronic device comprises a normal world virtual processor for the electronic device, and the secure environment is hardware isolated from the normal environment.

10. The method according to claim 1, further comprising:
determining whether a preset time interval has lapsed; and
repeating the method for verifying the system integrity of the electronic device when the preset time interval has lapsed.

11. A system for verifying system integrity of an electronic device, the system comprising:

a processing unit having a secure environment and a normal environment; and a non-transitory media readable by the processing unit, the media storing instructions that when executed by the processing unit cause the processing unit to:

generate a challenge using a verifier device provided within the secure environment;

transmit the challenge from the verifier device to a scanner device provided within the normal environment;

execute, an integrity verification function using the scanner device in the normal environment to generate a response, wherein the scanner device is instructed by the challenge to execute the integrity verification function;

encrypt the response using the scanner device, and transmit the encrypted response to the verifier device; and verify an integrity of the scanner device using the verifier device, whereby in response to a determination that the integrity of the scanner device is verified, to determine using the verifier device whether the response is valid, whereby in response to a determination that the response is invalid, to perform a mitigation action.

12. The system according to claim 11, wherein the instructions to verify the integrity of the scanner device comprises:
instructions for directing the processing unit to:
decrypt the encrypted response using the verifier device, whereby in response to a successful decryption of the encrypted response, to verify the integrity of the scanner device.

13. The system according to claim 11, wherein the verification function comprises:

instructions for directing the processing unit to:
scan a kernel code;
scan a process list;
scan a memory page table; or
check a status and parameter of a kernel protection mechanism.

14. The system according to claim 11, wherein the instructions to determine if the response is valid comprises:
instructions for directing the processing unit to:
match the response with data contained in a secure database provided in the secure environment, wherein when a match is not found, the response is determined as invalid.

15. The system according to claim 11 wherein before the instructions to generate the challenge using the verifier device, the instructions comprises:
instructions for directing the processing unit to:
verify integrity of the scanner device provided within the normal environment using the verifier device provided within the secure environment.

16. The system according to claim 15 wherein the instructions to verify the integrity of the scanner device provided within the normal environment comprises:
instructions for directing the processing unit to:
generate a verification response request using the verifier device and to transmit the verification response request from the verifier device to the scanner device, wherein the verification response request instructs the scanner device to generate an encrypted verification response, and transmit the encrypted verification response to the verifier device; and
determine whether the encrypted verification response is valid using the verifier device, whereby in response to a determination that the response is invalid, to perform the mitigation action.

17. The system according to claim 16, wherein the instructions to determine if the encrypted verification response is valid comprises:
instructions for directing the processing unit to:
decrypt the encrypted verification response using the verifier device, whereby in response to a determination that the verification response is decrypted, to match the decrypted verification response with verification data contained in a secure database provided in the secure environment, wherein when a match is not found, the verification response is determined as invalid.

18. The system according to claim 11, wherein the mitigation action comprises:
instructions for directing the processing unit to prevent execution of software devices provided in the normal environment.

19. The system according to claim 11, wherein the secure environment in the electronic device comprises a secure world virtual processor for the electronic device, the normal environment in the electronic device comprises a normal world virtual processor for the electronic device, and the secure environment is hardware isolated from the normal environment.

20. The system according to claim 11, wherein the system further comprises:
instructions for directing the processing unit to:
determine whether a preset time interval has lapsed; and
repeat the system for verifying the system integrity of the electronic device when the preset time interval has lapsed.

* * * * *